July 24, 1962 W. S. WILLIS 3,045,968
FIR TREE BLADE MOUNT
Filed Dec. 10, 1959

INVENTOR.
William S. Willis
BY
R. L. Spencer
ATTORNEY

United States Patent Office 3,045,968
Patented July 24, 1962

3,045,968
FIR TREE BLADE MOUNT
William S. Willis, Indianapolis, Ind., assignor to General Motors Corporation, Detroit, Mich., a corporation of Delaware
Filed Dec. 10, 1959, Ser. No. 858,736
2 Claims. (Cl. 253—77)

This invention relates to blade mounts and more particularly to an arrangement for fastening separately manufactured blades such as turbine or compressor blades to the rim of a wheel or disc. The blade mount is particularly useful in applications such as a gas turbine wherein the blades are subjected to extremely high stresses and temperatures such that the stresses in combination with the temperatures approach the elastic limit of the material used. In such applications it is important that the blade root provided be formed to provide for maximum shear strength and to be shaped to eliminate resonant vibrations commonly experienced in turbine blades.

It has previously been common practice in mounting blades to turbine discs to provide parallel grooves and teeth on the roots of the blades with corresponding parallel grooves and teeth formed in the turbine disc for each blade. In constructions of this type the roots of the blade between the grooves in the blades are of minimum diameter such that high stress loading of the blade roots in the area between the bottoms of the grooves result. The present invention provides turbine blades in which asymmetrical serrations are formed on the blade roots and corresponding asymmetrical serrations are formed on the wheel disc such that the asymmetrical serrations on the blade roots may be slidably inserted into the asymmetrical serrations on the wheel disc. By this arrangement of serrations the distance across the blade root between the bottom of the serrations is greater than that which can be attained with blade roots of conventional design. The blade root is therefore stronger and subject to less stress loading per square inch for a given size root and a given load than blade roots of conventional construction. It is further found that due to the asymmetrical arrangement of the serrations, the serrations counteract resonant vibrations experienced with blade mounts of conventional design.

An object of this invention is to provide a blade mount for turbine blades wherein the blade root is formed with asymmetrical serrations for maximum root strength.

Another object of this invention is to provide a blade mount for turbine blades wherein asymmetrical serrations are formed on the blade root and are arranged to damp out resonant vibrations.

A further object of this invention is to provide a blade mount wherein the blade root has formed thereon a series of serrations on opposite sides of the root wherein projections and grooves forming the serrations on one wall of the root are disposed in such relationship with respect to the projections and grooves forming the serrations on the opposite wall of the root that the projections on one wall are disposed substantially opposite the grooves on the opposite wall to provide a blade root of maximum strength.

An additional object of this invention is to provide a blade mount for mounting a turbine blade on a wheel rim wherein the wheel rim is provided with a V-shaped notch having a plurality of axially extending serrations on each side wall thereof asymmetrically arranged to slidably receive the root of the blade and wherein the blade root has formed on each side wall thereof a plurality of axially extending asymmetrically arranged serrations adapted to be slidably inserted into the serrations formed in the side walls of the V-notch wherein the face angle or slope of the contact surfaces of the serrations at one side of the root of the blade and the face angle or slope of the contact surfaces of the serrations at the opposite side of the blade root are equal but in opposite directions.

These and other objects and advantages of my invention will be apparent from the following specification and claims taken in conjunction with the accompanying drawings in which:

Figure 1:
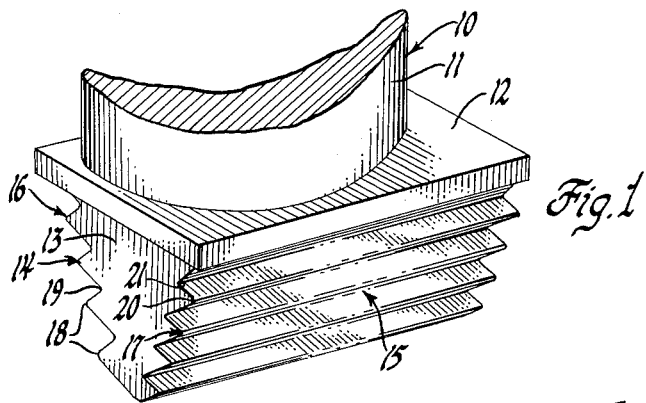
FIGURE 1 is a perspective view of a blade having its root formed in accordance with the principles of my invention.

Referring to FIGURE 1, there is shown a turbine blade unit generally indicated at 10 including a turbine blade 11, a blade platform 12 and a root 13 all formed as an integral unit. The blade root 13 is provided with a pair of side walls 14 and 15 which taper inwardly with the depth of the root such that the root is relatively narrow at its tip and relatively wide at its base adjacent plaform 12. The tapered side walls 14 and 15 are provided with a series of axially protruding serrations 16 and 17, the serrations 16 being formed to provide a series of projections 18 and grooves 19. Serrations 17 are formed to provide a series of projections 20 and grooves 21. As hereafter more particularly pointed out, the arrangement of the grooves and projections on the opposite side walls of the root is such that a projection on one side wall is positioned opposite a groove on the other side wall in order to provide a root having a greater minimum cross sectional area for a given sized root than that provided in conventional designs.

Figure 2:
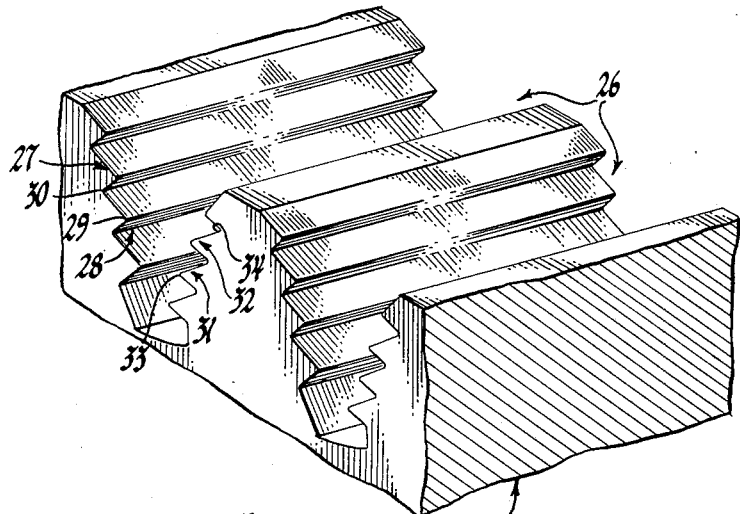
FIGURE 2 is a perspective view of section of a turbine wheel illustrating my invention.

Referring to FIGURE 2, there is shown a wheel disc 25 having a series of peripheral generally V-shaped grooves 26 formed in the rim of the rotor. Side wall 27 is shaped to provide a series of axially extending serrations 28 having projections 29 and grooves 30. Side wall 31 is shaped to provide a series of axially extending serrations 32 having projections 33 and grooves 34. As was the case of the grooves and projections on the root 13 of the blades 10, the grooves and projections are arranged such that the grooves are not opposite each other but a groove is always disposed opposite a projection. It will readily be understood that the serrations on the wheel disc are arranged to slidably receive the serrations formed upon the blade root. As shown in FIGURE 2, a series of V-shaped grooves having a series of serrations formed in accordance with the teachings herein are located around the periphery of the wheel in order to receive a series of blade roots having serrations as shown. In the assembly, wherein the serrations on the roots and the serrations on the wheel disc intermesh, the blade platform 12 extends in a circumferential direction of the disc and overlies the outer edges of the V-shaped grooves formed in the disc. The adjacent ends of the platforms of adjacent blades may be in contact with each other in the assembly. It will be understood that the blades are assembled to the disc simply by sliding the roots into the V-shaped grooves axially with respect to the disc with the cooperating serrations meshing with each other.

Figure 3:
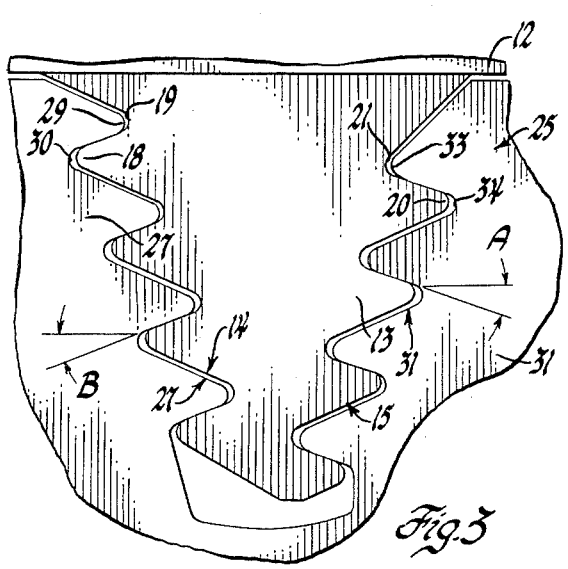
FIGURE 3 is an enlarged diagrammatic sketch illustrating the blade assembled in the turbine wheel.

The relationship of the serrations on the root and disc in intermeshing relationship is shown in more detail in FIGURE 3. As shown, the wall 27 of disc 25 is shaped to form a series of serrations, comprising projections 29 and grooves 30. The opposite wall 31 of disc 25 is shaped to form a series of serrations comprising projections 33 and grooves 34. It will be noted that each axially inwardly extending projection 29 on wall 27 is disposed opposite an axially outwardly extending groove 34 on wall 31. In like manner, each axially outwardly extending projection 18 of root 13 is disposed opposite an axially inwardly extending groove 21 of root 13. Thus each axially extending groove on the root 13 opposes an axially extending projection on the root and each axially extending projection on the wheel 25 opposes an axially extending groove on the wheel. The arrangement of projections and grooves results in a structure in which both the roots and the wheel are provided with a greater minimum cross sectional area for a given sized structure than that obtainable in conventional designs. The additional minimum cross sectional area resulting from the specific arrangement herein provides a structure in which the stress loading per square inch for a given sized structure operating under a given condition of operation is less than that obtainable in structures of conventional design. This is important particularly in the gas turbine applications wherein due to the high temperatures incurred and the high rotational speeds employed, the metal is stressed substantially to its elastic limit.

It will be noted that face angle A of the serrations on the wall 15 of root 13 and wall 31 of disc 25 and the face angle B of the serrations on the wall 14 of root 13 and wall 27 of disc 25 are chosen such that thrust forces arising between the contact surfaces at opposite sides of the root 13 will be balanced out. The slope of the contact surfaces of the projections and grooves at opposite sides of the root are equal but opposite in direction. Thus, the face angles A and B may each be 21 degrees, but of equal and opposite slope. It will be understood that turbine wheels rotate at very high speeds of rotation, thereby generating large centrifugal forces tending to throw the blades outwardly from the wheel. By providing contact surfaces of equal and opposite slope with respect to the longitudinal axis of the root on opposite sides of root, the force components of the centrifugal force balance each other out. Periodic and other vibrations which might otherwise be generated are damped out and greatly minimized.

The provision of the V-grooves in the periphery of the wheel and the V-shaped roots together with the asymmetric serrations arranged such that a projection on one side of the root is always disposed substantially opposite a groove on the other side of the root assures maximum strength. The blade roots are relatively narrow at their tips where the load stress is minimum and are relatively wide adjacent the inner end of the blade where the load carried by the root is greatest. In addition the arrangement of the projections and grooves such that no two grooves on the root are disposed opposite each other provides for maximum cross section of the root throughout its length from the root tip to the inner end of the blade. The V-grooves are found in the same manner as the roots for maximum strength.

I claim:

1. A turbine blade assembly comprising a circular turbine rotor having a series of substantially V-shaped slots in the periphery thereof, turbine blades having substantially V-shaped roots for fitting in said slots, a series of asymmetric serrations formed on each side wall of said slots, said serrations comprising an alternate series of axially extending V-shaped projections and recesses arranged such that the V-shaped projections on one side wall are disposed substantially opposite the V-shaped recesses on the other side wall, a series of asymmetric serrations formed on each side wall of each of said roots, said serrations comprising an alternate series of axially extending V-shaped projections and grooves arranged such that the V-shaped projections on one side wall of each root are disposed substantially opposite the V-shaped recesses on the other side wall of said root, the asymmetric serrations on each V-slot being arranged to slidably receive the asymmetric serration on one of said roots in intermeshing relationship, the intermeshing surfaces at one side of each root being disposed at a slope with respect to the longitudinal axis of the root, and the intermeshing surfaces at the opposite side of the root being disposed at an equal and opposite slope to said first slope with respect to the longitudinal axis of said root, a platform on each of said blades at the inner end of said blade formed integrally with said blade and root and disposed between said blade and root, each of said platforms overlying the open end of one of said slots and extending in a tangential direction with respect to said turbine rotor from each side of the blade, the platform on any one blade contacting a platform on the adjacent blades at opposite sides of said one blade when said roots are assembled in said turbine rotor.

2. A turbine blade assembly comprising a circular turbine rotor having a plurality of substantially V-shaped slots formed in the periphery thereof, a plurality of turbine blades each having a platform formed integrally therewith at the base of the blade, a substantially V-shaped root depending downwardly from each of said platforms, a series of asymmetric serrations formed on each side wall of each of said slots, said serrations comprising an alternate series of axially extending V-shaped projections and recesses arranged such that the axially extending projections on one side wall of each of said slots are disposed substantially opposite the axially extending recesses on the other side wall of each of said slots, said projections and recesses being formed integrally in the side walls of each of said slots, a series of asymmetric serrations formed on each side wall of each of said roots, each of said root serrations comprising an alternate series of axially extending V-shaped projections and grooves arranged such that the axially extending projections on one side wall of each root are disposed substantially opposite the axially extending recesses on the other side wall of said root, the asymmetric serrations of each V-slot being arranged to receive the asymmetric serrations of one of said roots in intermeshing relationship, each of said platforms overlying the open end of one of said V-slots at both sides of the open end of said slots and each of said platforms having a portion contacting an adjacent platform in the assembly.

References Cited in the file of this patent

UNITED STATES PATENTS 2,255,486    Doran ------------------ Sept. 9, 1941

FOREIGN PATENTS 148,814    Great Britain ------------ July 7, 1921
570,754    Germany -------------- Feb. 20, 1933
677,142    Great Britain ----------- Aug. 13, 1952
739,870    Great Britain ----------- Nov. 2, 1955
892,785    France ---------------- Jan. 13, 1944
989,042    France ---------------- May 16, 1951